(12) United States Patent
Malcolm et al.

(10) Patent No.: US 10,148,172 B2
(45) Date of Patent: Dec. 4, 2018

(54) POWER SUPPLY MODULE (71) Applicant: Sumida Electric (H.K.) Company Limited, Hong Kong (CN)

(72) Inventors: Douglas James Malcolm, Hong Kong (CN); Yanfei Liu, Hong Kong (CN); Guoping Zhang, Hong Kong (CN); Zhuo Wu, Hong Kong (CN); Hongnian Zhang, Hong Kong (CN); Xinliang Luo, Hong Kong (CN)

(73) Assignee: Sumida Electric (H.K.) Company Limited, Hong Kong (CN)

( * ) Notice: Subject to any disclaimer, the term of this patent is extended or adjusted under 35 U.S.C. 154(b) by 698 days.

(21) Appl. No.: 13/777,452

(22) Filed: Feb. 26, 2013

(65) Prior Publication Data

US 2014/0062437 A1 Mar. 6, 2014

(30) Foreign Application Priority Data

Aug. 28, 2012 (CN) .......................... 2012 1 0310001

(51) Int. Cl.
*H02M 3/156* (2006.01)
*H02M 3/155* (2006.01)

(52) U.S. Cl.
CPC ........... *H02M 3/156* (2013.01); *H02M 3/155* (2013.01)

(58) Field of Classification Search
CPC .................................. H01F 5/00; H01F 27/28
USPC ........................................... 336/83, 200, 232
See application file for complete search history.

(56) References Cited

U.S. PATENT DOCUMENTS

| 5,644,164 | A | 7/1997 | Roh | |
|---|---|---|---|---|
| 6,317,965 | B1* | 11/2001 | Okamoto | ................ H02M 1/12 29/602.1 |
| 8,283,789 | B2 | 10/2012 | Zeng et al. | |
| 2007/0041162 | A1* | 2/2007 | Sedio | ..................... H05K 1/181 361/714 |
| 2009/0121695 | A1* | 5/2009 | Pierson | ............... H02M 3/1584 323/283 |
| 2009/0207574 | A1* | 8/2009 | Chen | ..................... H05K 1/181 361/761 |
| 2011/0242775 | A1* | 10/2011 | Schaible | ................. H01F 17/04 361/752 |

(Continued)

FOREIGN PATENT DOCUMENTS

CN 101920721 12/2010
CN 102097415 6/2011

(Continued)

*Primary Examiner* — Tsz Chan
(74) *Attorney, Agent, or Firm* — Diederiks & Whitelaw, PLC (57) ABSTRACT

A power supply module is disclosed. The power supply module includes: a coil including a coil body and connecting ends; electronic components including at least an integrated circuit chip; a magnetic core which encloses the coil body, wherein at least one side of the magnetic core has a cavity provided therein, and the at least one electronic component is positioned in the cavity; a connector, which abuts against the side of the magnetic core having the cavity therein, covers the surface of the side, and is electronically connected to the coil and the electronic components. The power supply module is able to reduce the damage to the integrated circuit chip, decrease electromagnetic interferences and achieve an excellent cooling effect.

21 Claims, 9 Drawing Sheets

(56) References Cited

U.S. PATENT DOCUMENTS

| | | | | |
|---|---|---|---|---|
| 2012/0161913 A1* | 6/2012 | Yen | ................... | H01F 27/025 |
| | | | | 336/199 |
| 2012/0229986 A1* | 9/2012 | Huda | ................... | H05K 7/209 |
| | | | | 361/720 |
| 2012/0319668 A1* | 12/2012 | Tu | ................... | G06F 1/30 |
| | | | | 323/283 |
| 2013/0278371 A1* | 10/2013 | Hongzhong | ........ | H01F 27/2871 |
| | | | | 336/192 |

FOREIGN PATENT DOCUMENTS

| JP | 06013238 A | * | 1/1994 |
|---|---|---|---|
| JP | 06224056 A | * | 8/1994 |
| JP | 2003-188023 | | 7/2003 |
| JP | 2003188023 A | * | 7/2003 |

\* cited by examiner

POWER SUPPLY MODULE

FIELD OF THE INVENTION

The present invention relates to a power supply module.

BACKGROUND OF THE INVENTION

In the field of electronic products, for example, in order to accurately provide the voltage and current required by an electronic device when the device is in the actual work, an inductor, a resistor, a capacitor, an integrated circuit chip, and other electronic components are usually integrated together to form a power supply module for achieving a function of voltage or current conversion. The most common approach is assembling the separate electronic components mentioned above together by means of a certain circuit-connecting mode. This usually requires a large amount of space, and results in the rise of material costs and labor costs of the product.

With the continuously deeper development of the miniaturization and integration of the electronics industry, the traditional approach is to pre-install the above-mentioned electronic components on a printed circuit board, and then encapsulate the components by a resin in the outside, so as to form a structure of integrated power supply module. In such a power supply module, the inductor is the largest volume electronic component and the main energy storage component; the size of the power supply module is directly depended on the volume of the inductor; therefore, the inductor is the key to achieve further miniaturization after the integration of the power supply module. Since the conventional integrated power supply module just integrates the existing separate electronic components, the volume of the inductor limits further size reduction. Then, a structure appears that a coil forming the inductance, a capacitor and an integrated circuit chip as a whole are encapsulated by the overall magnetizer of an inductor. Reference is made to the Japanese Patent Publication No. P2003-188023A, which discloses a structure in which a magnetic core (i.e. magnetizer) encapsulating an inductance coil is provided in one of its surfaces with a cavity for receiving other electronic components, wherein the electronic connections of the coil with the other electronic components are achieved in the cavity by fixing them to a wire connection portion inside the magnetic core. In addition, after being received in the cavity, the electronic components are further covered by a resin.

Though the product mentioned above has some improvements in miniaturization, it still has the following defects:

Since the electronic components and the inductor are electronically connected in the cavity, it is necessary for the cavity to have a certain margin to ensure reliable assembly of the electronic components. The consequence is that the miniaturization of the product is adversely affected, and moreover, it causes a surface of an electronic component opposite to a pin to lean against the cavity with facing outward. Especially, when the electronic component is an integrated circuit chip, the body of the chip leans against the cavity with facing outward and then cannot fully contact to the magnetic core, which adversely affects the cooling effect and decreases the overall performance accordingly. Furthermore, because the electronic components are exposed in the cavity, a resin must be provided to cover the components to supply a further protection, which thus induces an increase in processing procedures.

SUMMARY OF THE INVENTION

Based on the above, it is an objective of the present invention to overcome the defects of the prior art, and provide a power supply module which meets the need of miniaturization development, and at the same time, is capable of effectively protecting an integrated circuit chip, reducing electromagnetic interference, and enhancing cooling effect.

A technical solution of the present invention is as follows:

A power supply module includes:

a coil, comprising a coil body and connecting ends;

electronic components, comprising at least an integrated circuit chip;

a magnetic core which encloses the coil body, wherein at least one side of the magnetic core is provided with a cavity, and the electronic components are positioned in the cavity; and a connector, which abuts against the side of the magnetic core having the cavity therein, covers the surface of the side, and is electronically connected to the coil and the electronic components.

Further details of the technical solutions will be described below.

Preferably, the connector may be a printed circuit board. As a choice, the connector may include a connecting circuit and a plastic insulating substrate which encloses the connecting circuit.

Preferably, the magnetic core may be a hexahedron and have two adjacent sides, the cavity may be provided in at least one of the two adjacent sides, and the insulating substrate abuts against both the two adjacent sides.

Preferably, the magnetic core may be a hexahedron and have two opposite sides and a side between the two opposite sides, the cavity is provided in at least one of the aforementioned sides, and the insulating substrate abuts against the two opposite sides and the side between the two opposite sides simultaneously.

Preferably, the connector further includes a heat conductive layer (such as a metal sheet) which abuts against the integrated circuit chip and is at least partially exposed to outside of the plastic insulating substrate.

Preferably, a heat-conductive filler which encloses the electronic components is positioned in the cavity.

Preferably, the connector further includes a terminal for external electrical connection.

Preferably, the cavity is positioned aside the coil and in a left-right positional relationship with respect to the coil; or, the cavity is positioned below the coil and in a top-down positional relationship with respect to the coil.

Preferably, the electronic component only consists of an integrated circuit chip which integrates one or multiple resistors, one or multiple capacitors, one or multiple MOSFETs, one or multiple drive circuits, one or multiple pulse width modulators and one or multiple controllers together.

As a choice, the electronic component may further include one or multiple resistors and one or multiple capacitors, and the integrated circuit chip integrates one or multiple MOSFETs, one or multiple drive circuits, one or multiple pulse width modulators and one or multiple controllers together. The integrated circuit chip, the resistor, the capacitor and the inductor formed by the coil, constitute together the power supply module. The advantages or principles of the above-mentioned technical solutions are described below.

1. The integrated circuit chip is positioned in the cavity of the magnetic core, so that electromagnetic interferences from the outside cannot be easily received by the integrated circuit chip. Therefore immunity to electromagnetic interference can be improved. This effectively solves the problem of electromagnetic interferences of the integrated circuit chip. In addition, the electromagnetic noises generated by the integrated circuit chip cannot be easily transmitted to other circuits which are located outside of the power module. Therefore, the performance of the product is greatly enhanced. Meanwhile, since the circuits are covered by the magnetic core after being connected to the coil through connector, the size of the cavity can be made smaller; which is favorable to miniaturization, has simpler processing procedures and can effectively protect the circuit chip through the separation by the connector, without needing any additional protection measures. Moreover, the proposed method makes the vast majority of the main body of the integrated circuit chip contact with the magnetic core, which is favorable for heat transfer of the integrated circuit chip and therefore enhances the overall performance accordingly.

2. The connector can be a printed circuit board, or a designed connection circuit encapsulated by a plastic insulating substrate which can be a single-face structure or a multi-face structure, wherein using a multi-face structure can ensure a more reliable connection of the substrate to the magnetic core. Depending on the requirements of different environments, the multi-face structure can also provide further protections to the magnetic core.

3. The connector is connected to at least one surface of the magnetic core, which can increase the heat transfer area of the integrated circuit chip and therefore improve the heat transfer performance thereof, and at the same time, the connection circuit can be provided on the plastic insulating substrate in a more flexible way.

4. The connector may be provided with a heat-conductive metal sheet by which a part of heat generated by the integrated circuit chip is transferred to the outside, which improves cooling effect of the device and enhances the reliability thereof.

5. A heat-conducting filler may be added in the cavity, so that the heat generated by the integrated circuit chip can be transferred to the ambient and circuit board through the filler and the magnetic core, which further improves the cooling effect of the device.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment, and wherein.

EXPLANATION OF THE REFERENCE SIGNS

10—coil body,
11—connecting end,
20—integrated circuit chip,
21—resistor,
22—capacitor,
30—magnetic core,
31—cavity,
40—connector,
41—heat-conductive metal sheet,
42—terminal,
50—heat-conducting filler.

DESCRIPTION OF THE PREFERRED EMBODIMENTS

The present invention is more particularly described in the following examples that are intended as illustration only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

Embodiment 1

As illustrated from FIG. 1 to FIG. 8, a power supply module is provided. A coil includes a coil body 10 and two connecting ends 11 connected to the coil body 10. The coil is a pre-wound coil wound with a flat or round copper wire according to predetermined number of coil turns and shape, wherein its coil body 10 is wrapped by a magnetic core 30 made of a magnetic material. The magnetic core 30 is usually designed as a cuboid or cube, and of course, according to actual needs it can be designed as other shapes, such as cylinder, etc. The coil wrapped by the magnetic core 30 serves as an inductor which, together with other electronic components (e.g. integrated circuit chip 20, resistor 21 and capacitor 22), is mounted on a connector 40 with a pre-designed circuit; since the magnetic core 30 is further provided with a cavity 31 in a position on top of the electronic components, and the height and width of the cavity are designed to be just matching the size of the electronic components, so that the integrated circuit chip resides inside the cavity 31 under a situation of ensuring sufficient contact of the chip with the cavity 31 of the magnetic core 30, and at the same time, the surface provided with the cavity 31 is closely covered by the connector 40.

In the present embodiment, the connector 40 may be a printed circuit board, or a plastic insulating substrate made by molding technology after applying connection circuit. The connector 40 further includes terminals 42 for external electrical connection.

As an optional configuration, in order to achieve better heat transfer of the integrated circuit chip 20, the cavity 31 can also be filled with a heat-conducting filler 50 which encloses the chip 20, and then the heat generated by the chip 20 can be conducted by the magnetic core 30, which improves the cooling effect.

Figure 1:
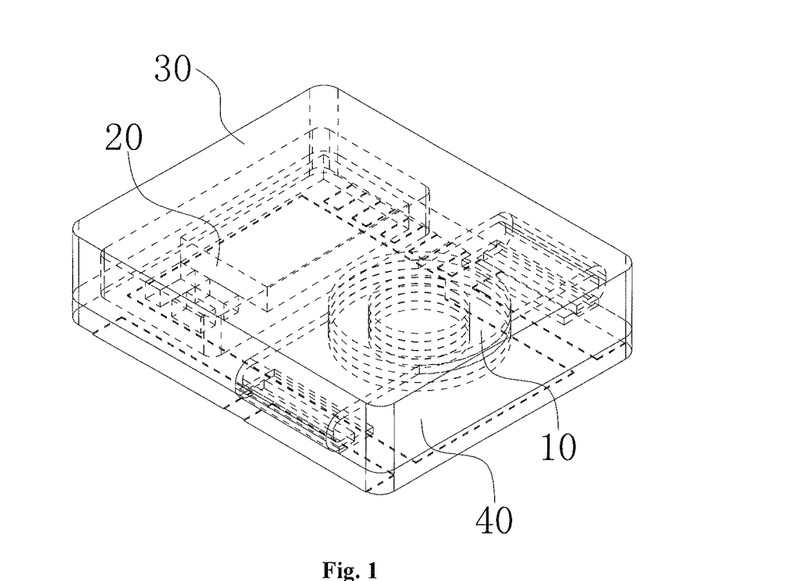
FIG. 1 is a perspective view of a power supply module according to Embodiment 1 of the present invention.
Figure 2:
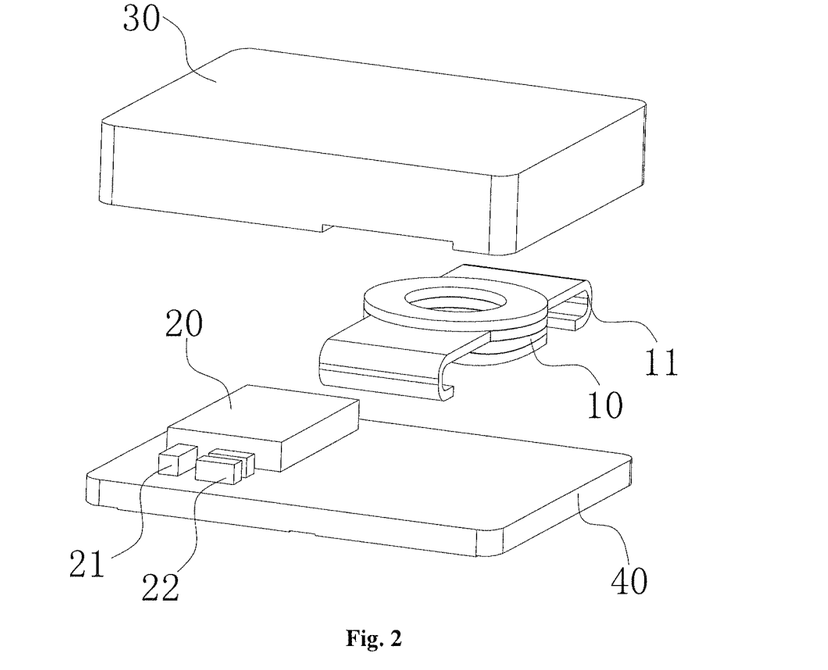
FIG. 2 is an exploded view of the power supply module according to Embodiment 1 of the present invention, exploded in a first direction.
Figure 3:
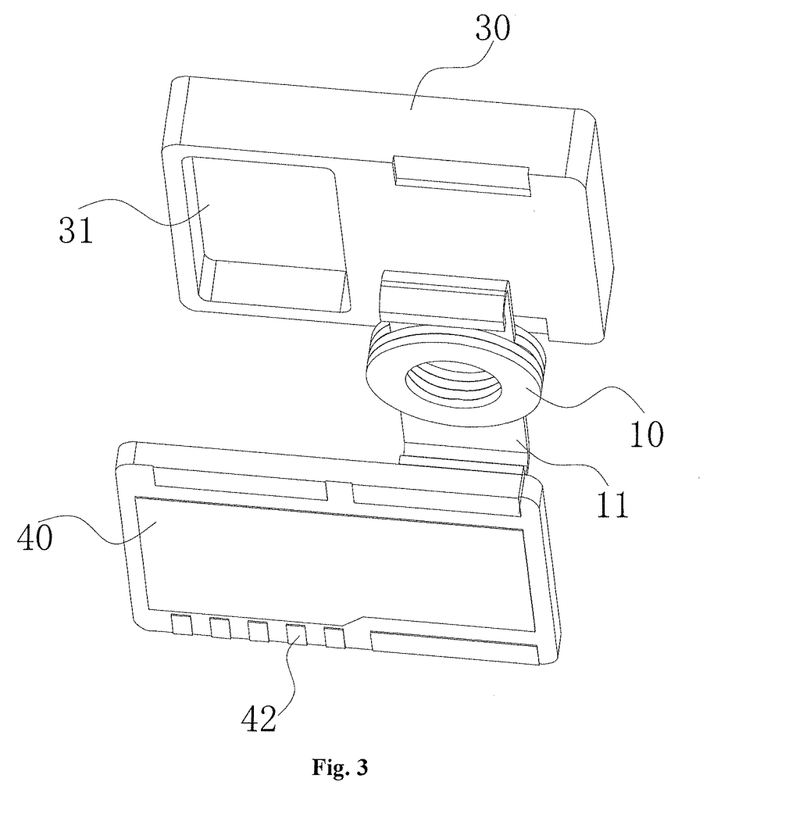
FIG. 3 is an exploded view of the power supply module according to Embodiment 1 of the present invention, exploded in a second direction.
Figure 4:
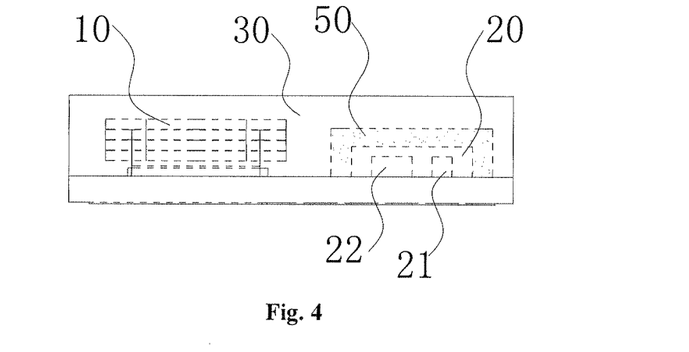
FIG. 4 is a side perspective view of the power supply module according to Embodiment 1 of the present invention.
Figure 5:
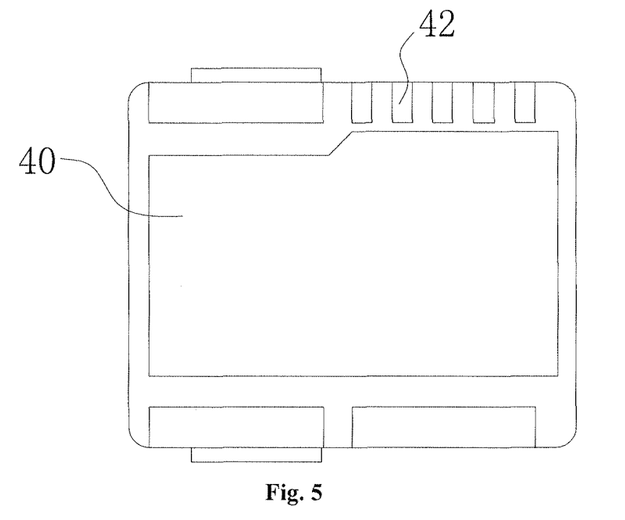
FIG. 5 is a bottom view of the power supply module according to Embodiment 1 of the present invention.
Figure 6:
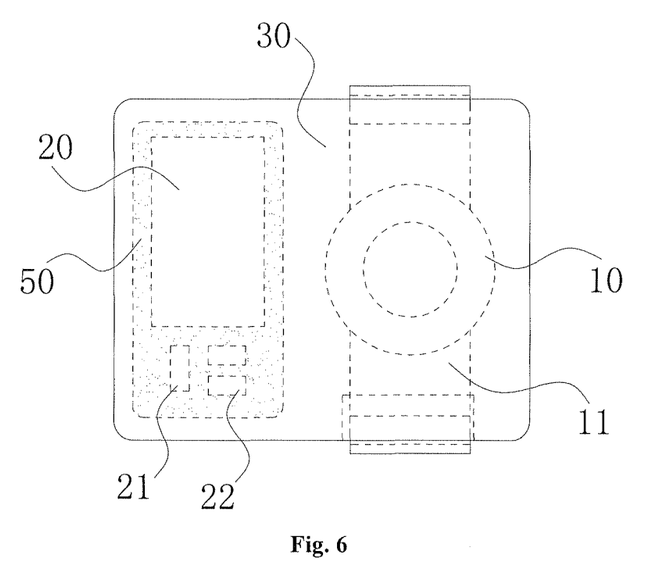
FIG. 6 is a top perspective view of the power supply module according to Embodiment 1 of the present invention.
Figure 7:
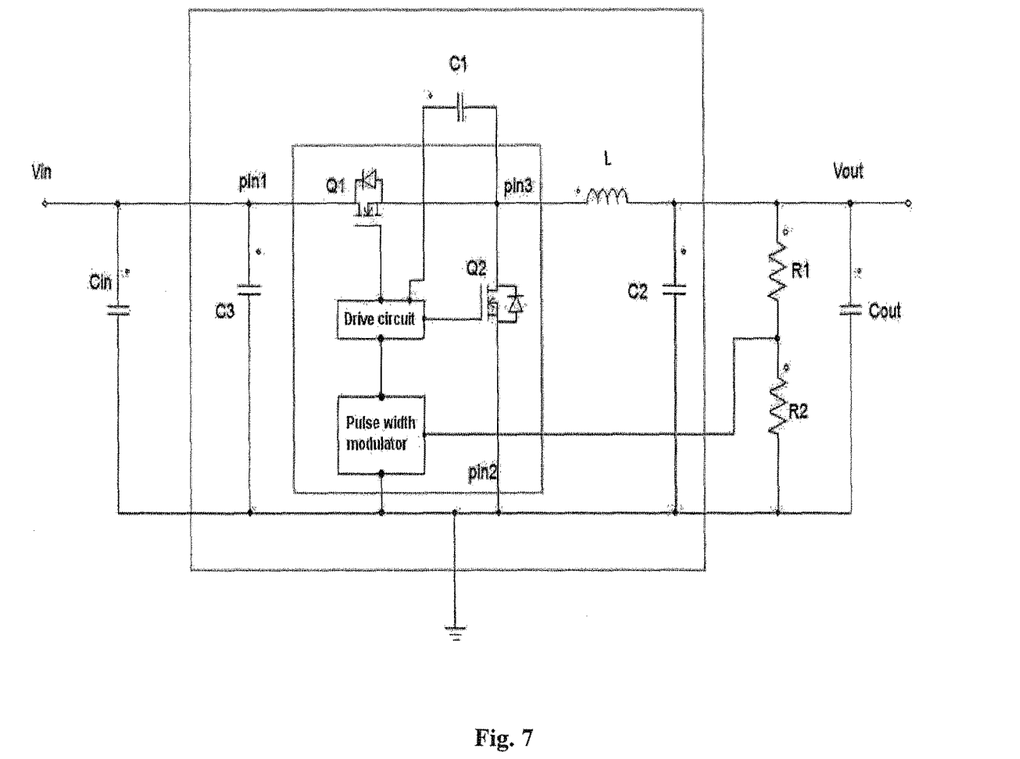
FIG. 7 is a circuit diagram of the power supply module according to Embodiment 1 of the present invention.
Figure 8:
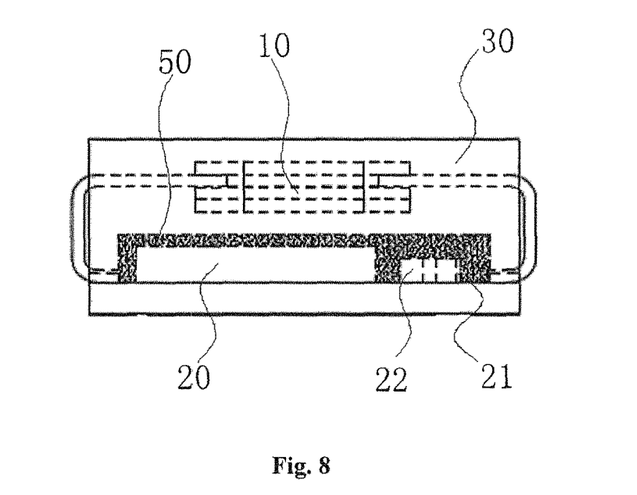
FIG. 8 is a side perspective view of the power supply module according to Embodiment 1 of the present invention, wherein the cavity and the coil are in a top-down positional relationship.
Figure 9:
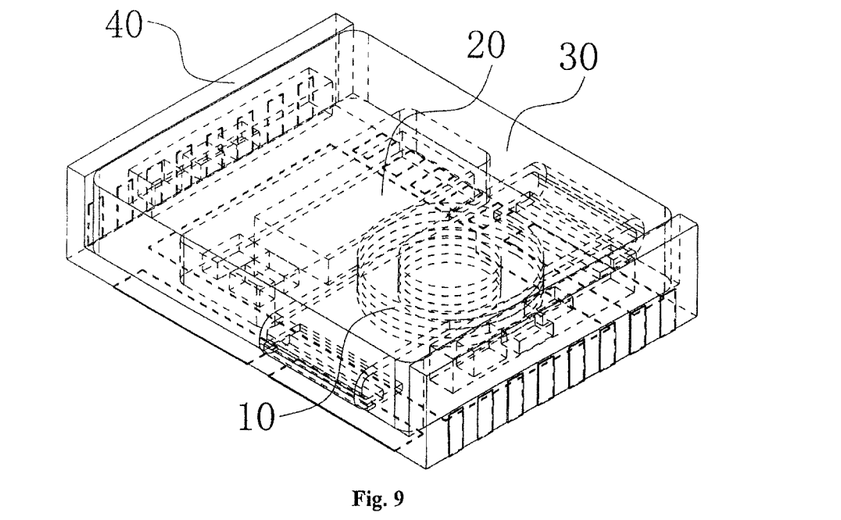
FIG. 9 is a perspective view of a power supply module according to Embodiment 2 of the present invention.
Figure 10:
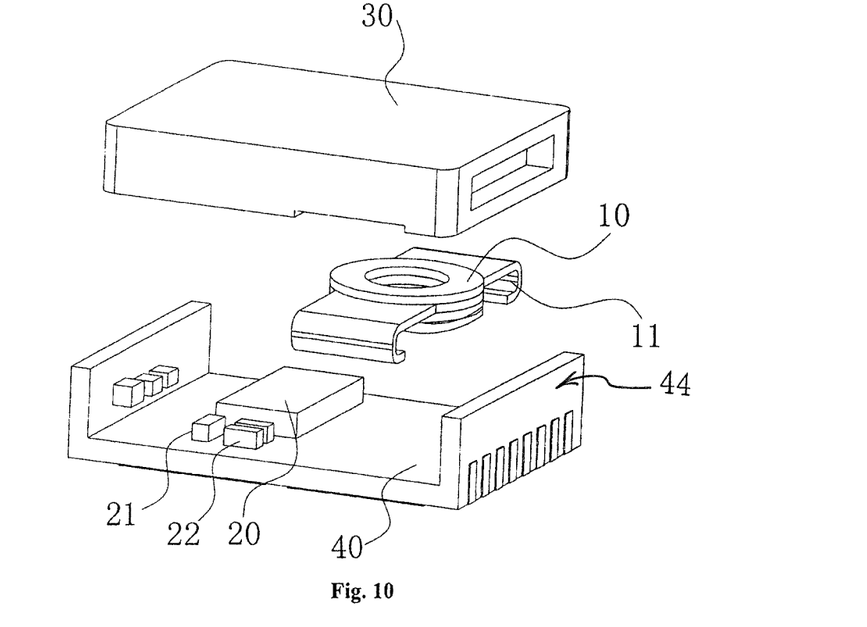
FIG. 10 is an exploded view of the power supply module according to Embodiment 2 of the present invention, exploded in a first direction.
Figure 11:
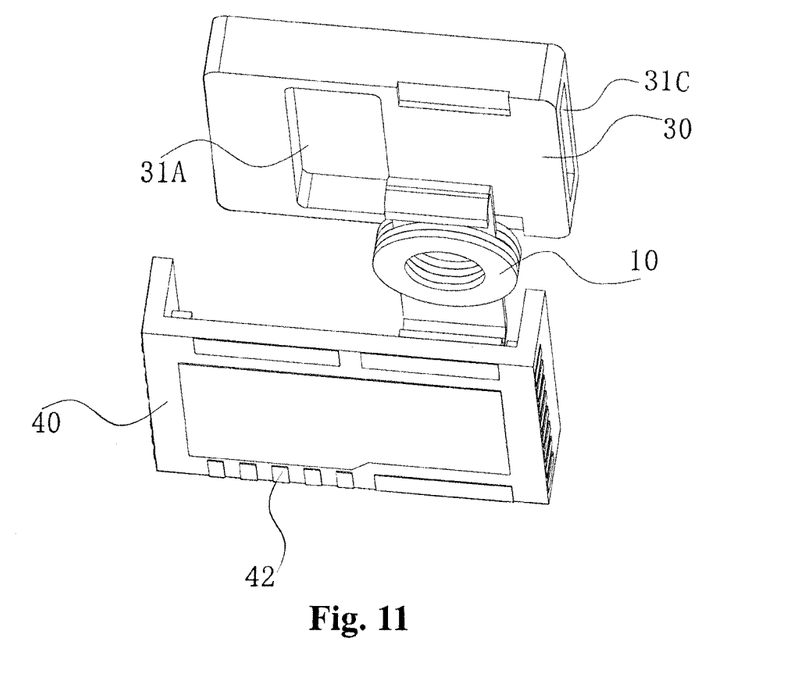
FIG. 11 is an exploded view of the power supply module according to Embodiment 2 of the present invention, exploded in a second direction.
Figure 12:
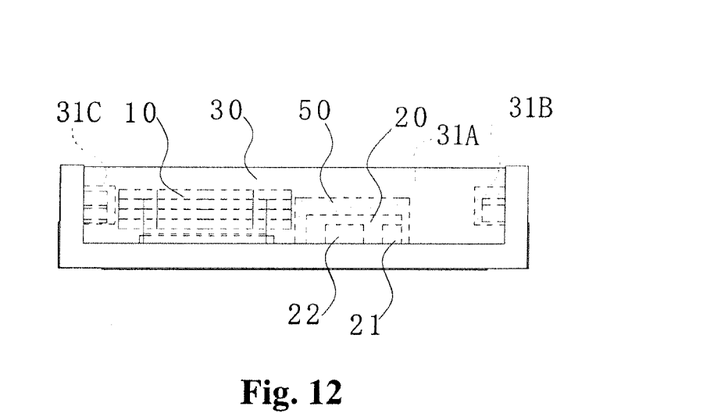
FIG. 12 is a side perspective view of the power supply module according to Embodiment 2 of the present invention.
Figure 13:
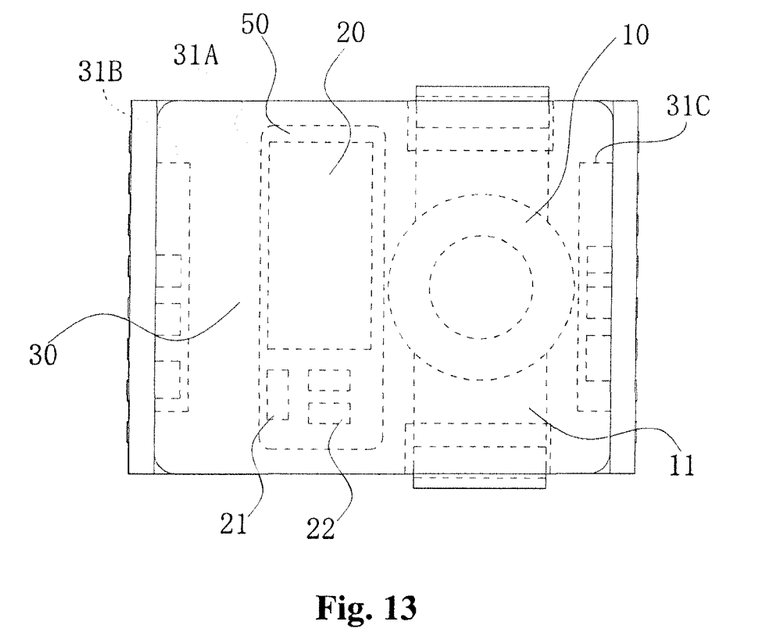
FIG. 13 is a top perspective view of the power supply module according to Embodiment 2 of the present invention.
Figure 14:
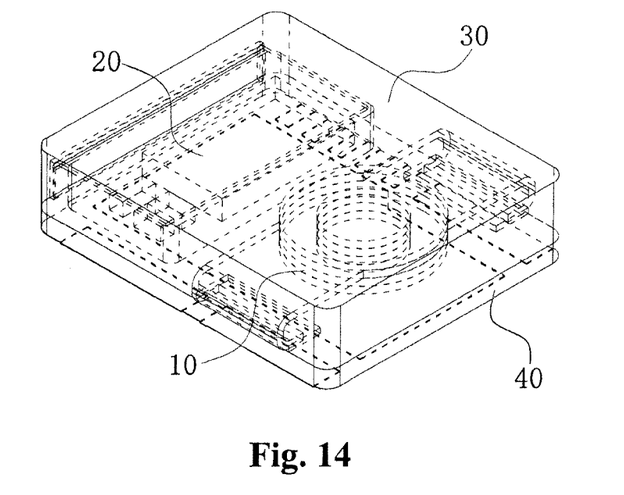
FIG. 14 is a perspective view of a power supply module according to Embodiment 3 of the present invention.
Figure 15:
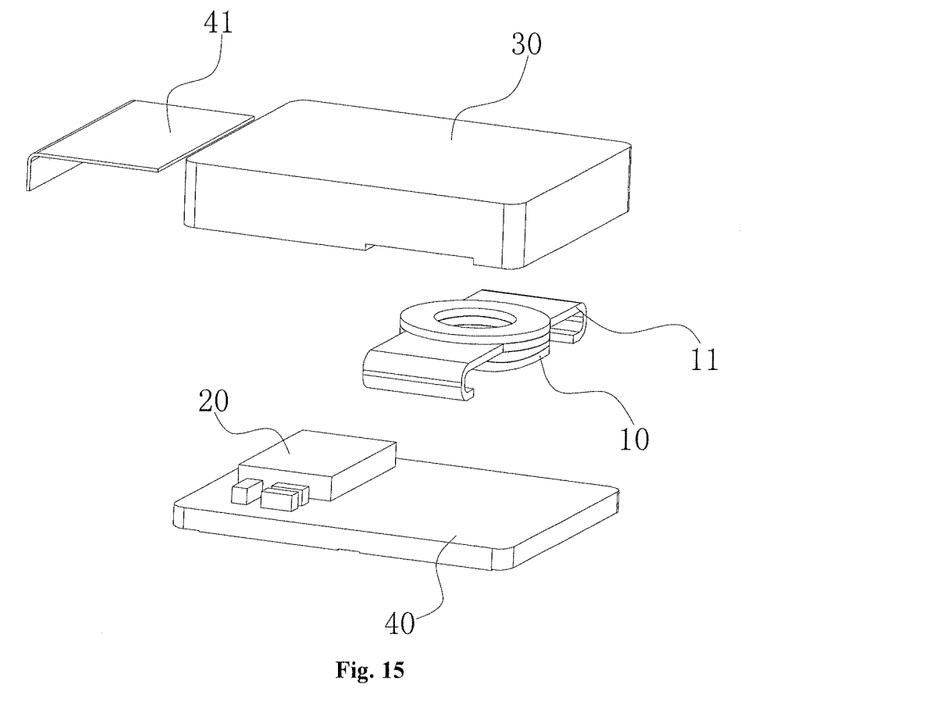
FIG. 15 is an exploded view of the power supply module according to Embodiment 3 of the present invention, exploded in a first direction.
Figure 16:
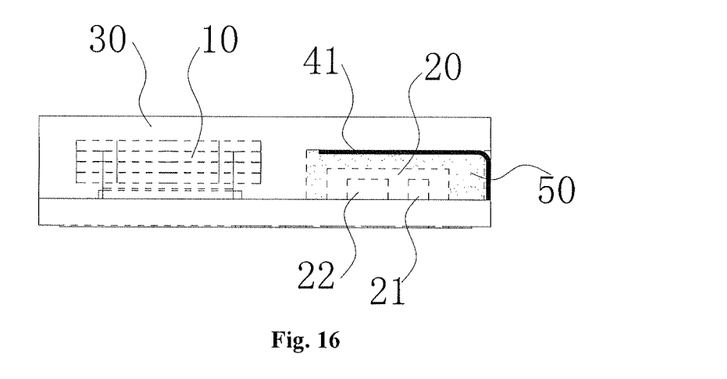
FIG. 16 is a side perspective view of the power supply module according to Embodiment 3 of the present invention.
Figure 17:
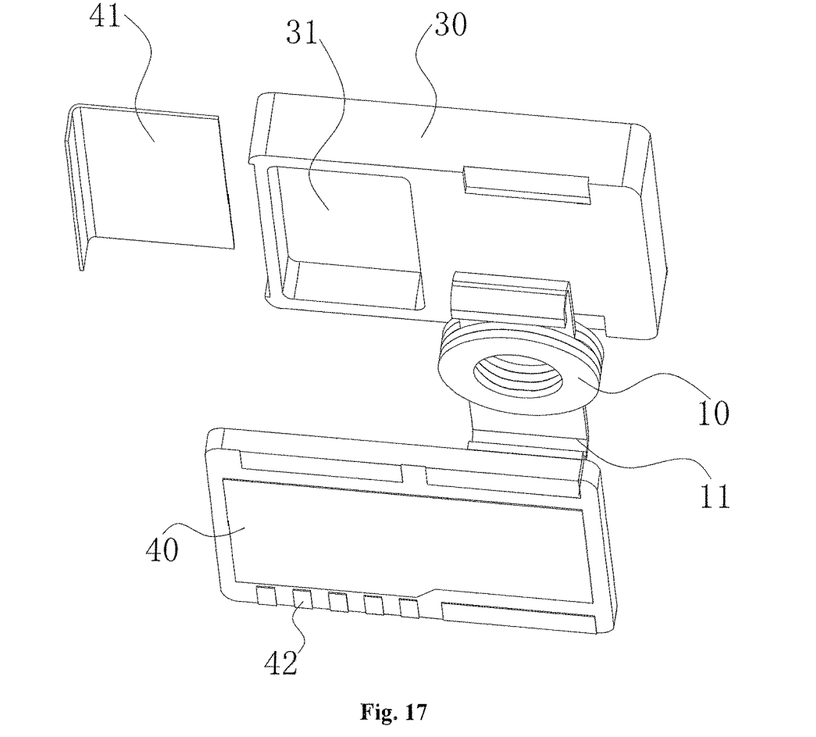
FIG. 17 is an exploded view of the power supply module according to Embodiment 3 of the present invention, exploded in a second direction.
Figure 18:
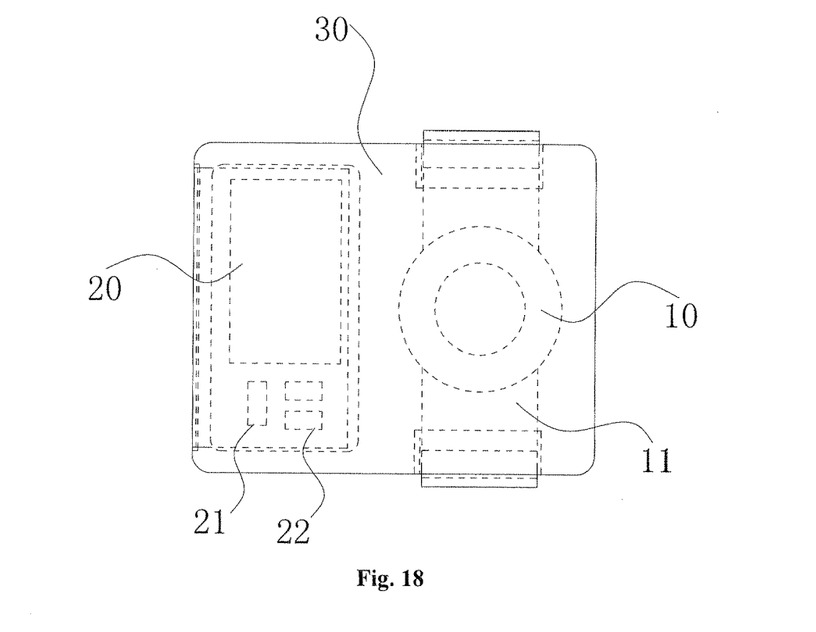
FIG. 18 is a top perspective view of the power supply module according to Embodiment 3 of the present invention.

As an optional configuration, the cavity 31 may be positioned aside the coil, and then the cavity 31 and the coil are in a left-right positional relationship. And according to actual needs, the cavity 31 may be positioned below the coil, and then the cavity 31 and the coil are in a top-down positional relationship as shown in FIG. 8.

The present embodiment has the following advantages:

1. The integrated circuit chip 20 resides inside the cavity 31 of the magnetic core 30 and be covered by the connector 40, which reduces the possibility of damaging the chip 20, and at the same time, electromagnetic interferences from outside of the power module can be attenuated by the magnetic core 30 and the chip 20 is less susceptible to the electromagnetic interference, which improves the resistance performance of the structure to electromagnetic interferences and effectively solves the problem of electromagnetic interferences of the integrated circuit chip 20; and, similarly, the electromagnetic interferences generated by the integrated circuit chip 20 cannot be easily received by the external circuit of the power supply module, and also because of the sufficient contact of the chip 20 with the magnetic core 30, the heat-transfer performance of the chip is also improved, which greatly enhances the overall performance of the product accordingly, 2. The connector 40 is positioned on the surface of the magnetic core 30 provided with the cavity 31, which can increase the heat transfer area of the chip 20 and therefore improve the heat transfer performance, and at the same time, the connection circuit can be provided on the plastic insulating substrate in a more flexible way.

3. The heat-conducting filler 50 is further provided in the cavity 31, so that the heat generated by the chip 20 can be transferred to the outside more quickly through the filler 50 and the magnetic core 30, which further improves the cooling effect of the power module.

Embodiment 2

Fig.9 to Fig.13 illustrate a further embodiment wherein the difference between this embodiment and Embodiment 1 is that: in Embodiment 2, the connector 40 is a U-shaped plastic insulating substrate 44 for encapsulating the connection circuit (not separately shown), wherein the substrate abuts against three sides of the magnetic core 30, and corresponding to the three sides, the cavity 31A provided in first side portion may be provided separately or partially for accommodating the electronic components, which depends on the design needs. Preferably the magnetic core 30 further includes an opposite side portion and a second side portion, both of the opposite side portion and the second side portion are provided with a respective cavity 31B and 31C, and the insulating substrate 40 abuts against both the opposite side portion and the first and second side portions simultaneously.

Embodiment 3

FIG. 14 to FIG. 18 illustrate Embodiment 3. The difference between Embodiment 3 and Embodiment 1 is that: in Embodiment 3, the connector 40 is a plastic insulating substrate encapsulating the connection circuit, wherein the connector 40 integrally connected to a heat-conductive metal sheet 41 which abuts against the integrated circuit chip 20 and attaches to the top of the chip 20 and is at least partially exposed outside of the plastic insulating substrate. A portion of the heat generated by the integrated circuit chip is transferred to the outside via the heat-conductive metal sheet 41, which improves the cooling effect of the device and enhances the reliability thereof.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments are chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A power supply module, comprising:
   a coil, comprising a coil body and connecting ends;
   electronic components, including at least an integrated circuit chip;
   a magnetic core including first and second adjacent side portions, wherein the first side portion of the magnetic core is provided with a cavity, and the electronic components are positioned in the cavity so as to be entirely recessed within the cavity and surrounded by the magnetic core on all but one, open side of the cavity, with at least the integrated circuit chip being in contact with the magnetic core within the cavity; and
   a connector electronically connected to the coil and the electronic components, while also abutting against at least the first portion of the magnetic core, wherein both the electronic components and the cavity are covered at the one side of the cavity by the connector and the coil body is enclosed in the magnetic core.

2. The power supply module of claim 1, wherein the connector is a printed circuit board.

3. The power supply module of claim 1, wherein the connector comprises a plastic insulating substrate for encapsulating a connecting circuit.

4. The power supply module of claim 3, wherein an additional cavity is also provided in the second side portion of the magnetic core.

5. The power supply module of claim 3, wherein the connector further comprises a heat-conductive metal sheet which abuts against the integrated circuit chip and is at least partially exposed to outside of the insulating substrate.

6. The power supply module of claim 1, further comprising a heat-conducting filler which encloses the electronic components and is positioned in the cavity, wherein heat is transferred from said integrated circuit through the heat-conducting filler.

7. The power supply module of claim 1, wherein the connector further comprises a terminal for external electrical connection.

8. The power supply module of claim 1, wherein the cavity is positioned aside the coil, and the cavity and the coil are in a left-right positional relationship.

9. The power supply module of claim 1, wherein the electronic component is an integrated circuit chip which is a unit module integrating one or multiple resistors, one or multiple capacitors, one or multiple MOSFETs, one or multiple drive circuits, one or multiple pulse width modulators and one or multiple controllers together.

10. The power supply module of claim 1, wherein the electronic components further comprises one or multiple resistors and/or one or multiple capacitors.

11. The power supply module of claim 10, wherein the integrated circuit chip is a unit module which integrates one or multiple MOSFETs, one or multiple drive circuits, one or multiple pulse width modulators and one or multiple controllers together.

12. The power supply module of claim 1, wherein the connector is electronically connected to the electronic components outside of the cavity.

13. The power supply module of claim 12, wherein the connector is electronically connected to the coil outside of the magnetic core.

14. The power supply module of claim 1, wherein a majority of the integrated circuit chip is in contact with the magnetic core.

15. The power supply module of claim 14, wherein a portion of the integrated circuit chip is not in contact with the magnetic core.

16. The power supply module of claim 1, wherein at least portions of the electronic components are spaced from the magnetic core.

17. The power supply module of claim 16, wherein the magnetic core is pre-formed with the cavity.

18. The power supply module of claim 1, wherein the magnetic core is formed with multiple, spaced cavities which are covered by the connector.

19. A power supply module, comprising:
a coil, comprising a coil body and connecting ends;
electronic components, including at least an integrated circuit chip;
a magnetic core including first and second adjacent side portions, wherein the first side portion of the magnetic core is provided with a cavity, and the electronic components are positioned in the cavity so as to be entirely recessed within the cavity and surrounded by the magnetic core on all but one, open side of the cavity, with at least the integrated circuit chip being in contact with the magnetic core within the cavity; and
a connector electronically connected to the coil and the electronic components, while also abutting against at least the first portion of the magnetic core, wherein both the electronic components and the cavity are covered at the one side of the cavity by the connector and the coil body is enclosed in the magnetic core, wherein the magnetic core further includes an opposite side portion, both of the opposite side portion and the second side portion are provided with a respective cavity, and the insulating substrate abuts against both the opposite side portion and the first and second side portions simultaneously.

20. The power supply module of claim 19, wherein the cavity is positioned below the coil, and the cavity and the coil are in a top-down positional relationship.

21. A power supply module, comprising:
a coil, comprising a coil body and connecting ends;
electronic components, including at least an integrated circuit chip;
a magnetic core including first and second adjacent side portions, wherein the first side portion of the magnetic core is provided with a cavity, with the cavity being positioned aside the coil such that the cavity and the coil are in a left-right positional relationship, and the electronic components are positioned in the cavity so as to be entirely recessed within the cavity and surrounded by the magnetic core on all but one, open side of the cavity, with at least the integrated circuit chip being in contact with the magnetic core within the cavity; and
a connector electronically connected to the coil and the electronic components, while also abutting against at least the first portion of the magnetic core, wherein both the electronic components and the cavity are covered at the one side of the cavity by the connector and the coil body is enclosed in the magnetic core.

* * * * *